(12) United States Patent
Light et al.

(10) Patent No.: US 8,322,981 B2
(45) Date of Patent: Dec. 4, 2012

(54) AIRCRAFT FLUID DIVERSION INLET LOUVER

(75) Inventors: Stacey H. Light, San Diego, CA (US); Alan B. Minick, Madison, AL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 562 days.

(21) Appl. No.: 12/395,849

(22) Filed: Mar. 2, 2009

(65) Prior Publication Data

US 2010/0221104 A1 Sep. 2, 2010

(51) Int. Cl.
*F01D 1/02* (2006.01)
(52) U.S. Cl. .................................................. 415/183
(58) Field of Classification Search .................. 415/183
See application file for complete search history.

(56) References Cited

U.S. PATENT DOCUMENTS

| | | | |
|---|---|---|---|
| 3,972,383 A | 8/1976 | Green | |
| 3,991,849 A | 11/1976 | Green et al. | |
| 4,203,566 A * | 5/1980 | Lord | 244/57 |
| 6,634,597 B2 | 10/2003 | Johnson et al. | |
| 6,735,951 B2 | 5/2004 | Thompson | |
| 6,777,822 B1 | 8/2004 | Suttie et al. | |
| 6,796,131 B2 | 9/2004 | Sampson | |
| 7,014,144 B2 | 3/2006 | Hein et al. | |
| 7,093,447 B2 | 8/2006 | Thompson et al. | |
| 7,137,240 B2 | 11/2006 | Thompson | |
| 7,195,180 B2 | 3/2007 | Lee | |
| 7,210,652 B2 | 5/2007 | Hein et al | |
| 7,254,465 B2 | 8/2007 | McGinley | |
| 7,318,499 B2 | 1/2008 | Stevenson et al. | |
| 7,337,605 B2 | 3/2008 | Hagshenas | |
| 7,344,107 B2 | 3/2008 | Campbell et al. | |
| 7,367,193 B1 | 5/2008 | Thompson | |
| 7,461,814 B2 | 12/2008 | Hein | |
| 7,469,545 B2 | 12/2008 | Riley | |
| 2006/0179846 A1* | 8/2006 | Manrique et al. | 60/785 |

* cited by examiner

Primary Examiner — Julio J Maldonado
Assistant Examiner — Robert Bachner
(74) Attorney, Agent, or Firm — Carlson, Gaskey & Olds PC

(57) ABSTRACT

An inlet system, including for an auxiliary power unit includes an inlet louver mounted to an inlet duct, the inlet louver defines a multiple of vanes positioned to shield the inlet duct from fluids which fall in direction generally transverse to a free stream airflow.

20 Claims, 5 Drawing Sheets

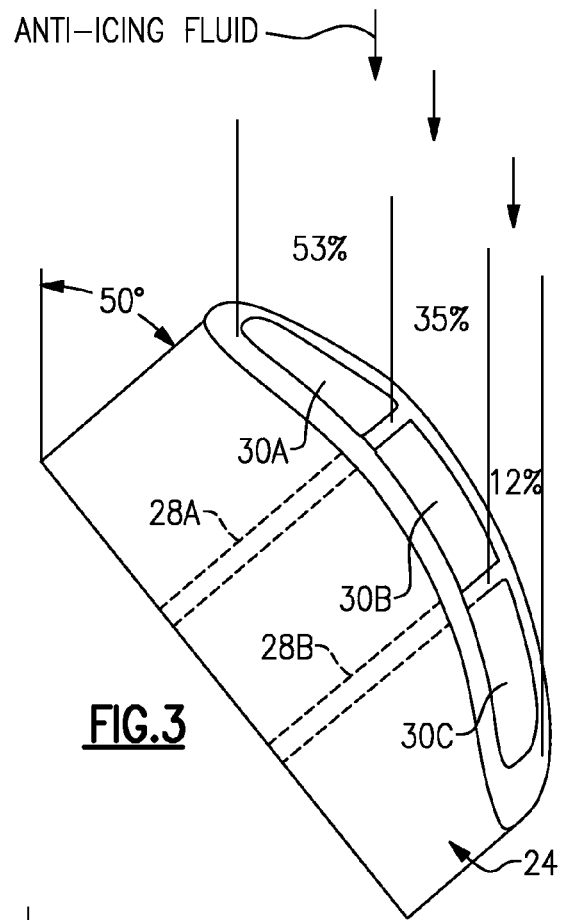
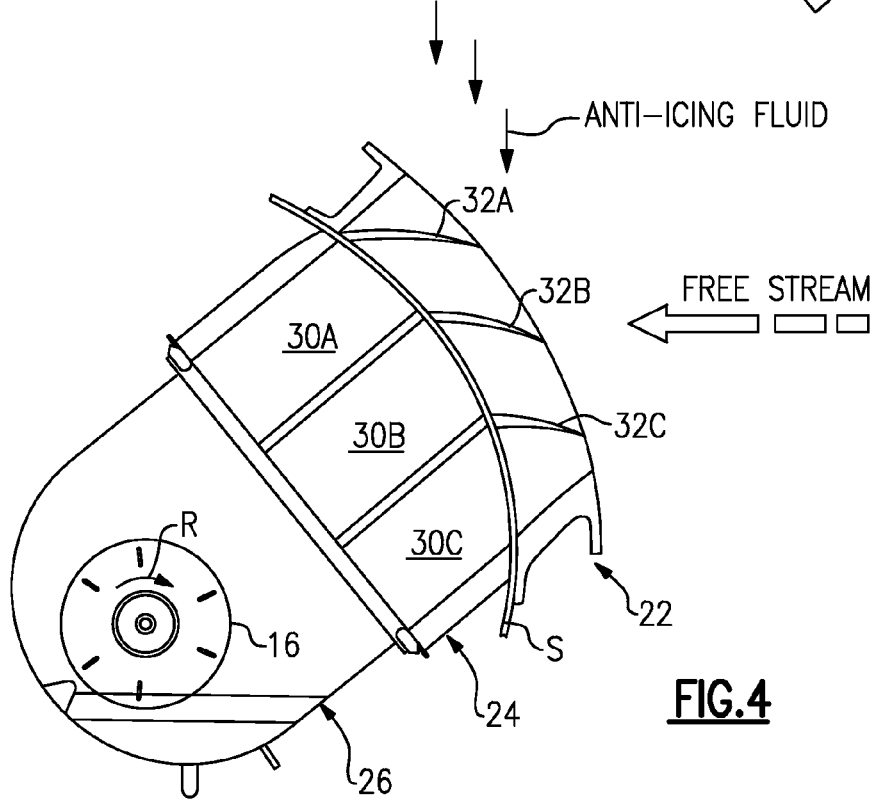

AIRCRAFT FLUID DIVERSION INLET LOUVER

BACKGROUND

The present application relates to an inlet, for example such as used on an auxiliary power unit.

Aircraft auxiliary power units (APU) are gas turbine engines often located in an aircraft empennage, fuselage, wing root or fuselage wheel well area. The APU typically receives inlet airflow through an inlet duct and discharges an exhaust through an exhaust duct.

During various conditions including anti-icing operations, various fluids may enter the APU inlet. If a sufficient quantity of fluid enters the APU inlet, damage to the APU may eventually occur.

A winter inlet louver may be temporarily mounted over the APU inlet. Although effective to protect against overnight snow, the winter inlet louver may not significantly protect from anti-icing fluids. Furthermore, the winter inlet louver often applies a spin or prewhirl to the free stream airflow which may reduce APU performance.

SUMMARY

An inlet system such as for an auxiliary power unit according to an exemplary aspect of the present application includes an inlet louver mounted to an inlet duct, the inlet louver defines a multiple of vanes positioned to shield the inlet duct from fluids which fall in direction generally transverse to a free stream airflow.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 3 is a sectional view of an inlet duct illustrating vertical fluid flow capture;

FIG. 4 is a sectional view of an APU inlet assembly that includes an inlet louver with a multiple of vanes.

DETAILED DESCRIPTION

Figure 1:
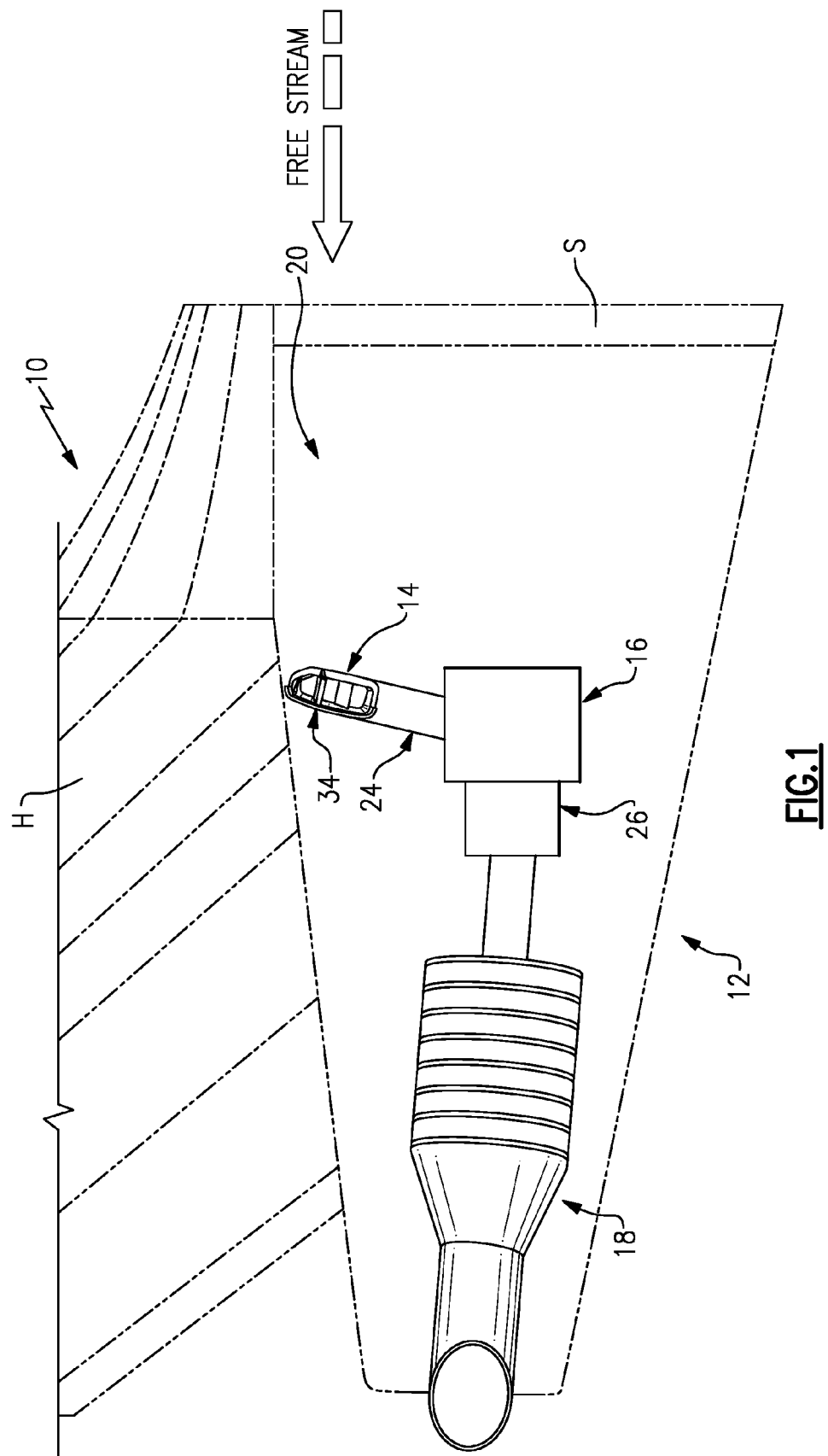
FIG. 1 is a is a cross-sectional schematic showing an auxiliary power unit (APU) mounted within an empennage of an aircraft.

FIG. 1 schematically illustrates an aircraft 10 having an auxiliary power unit (APU) system 12 mounted therein. It should be understood that although a particular empennage mounted APU system configuration is illustrated in the disclosed non-limiting embodiment, the APU system 12 may be mounted in other locations, configurations and/or machines, including aircraft and non-aircraft configurations.

The APU system 12 generally includes an APU inlet system 14, an APU 16 and an APU exhaust assembly 18. The APU inlet system 14 generally includes an inlet assembly 20, an inlet louver 22, an inlet duct 24 and an inlet plenum 26 in communication with the APU 16. The inlet louver 22 generally extends outward relative the aircraft skin S such that anti-icing fluids will flow along the aircraft skin S and around the inlet louver 22 (FIG. 2).

Referring to FIG. 3, the inlet duct 24 in one non-limiting embodiment includes two splitters 28A, 28B which form three passages 30A, 30B, 30C. Anti-icing operations typically apply fluids from above such that the fluids fall primarily vertically transverse to the free stream airflow into the inlet duct 24. The typical location of the APU inlet system 14 in the aircraft empennage also may receive fluid shedding from other structures such as the vertical stabilizer H (FIGS. 1 and 2). The inlet duct 24 in the disclosed non-limiting embodiment defines an upper passage vertical capture area of approximately 53%; a middle passage vertical capture area of approximately 35%; and a lower passage vertical capture area of approximately 12%. That is, the vertical capture area is that area which may receive a particular percentage of fluid which falls vertically into the disclosed non-limiting embodiment of the inlet duct 24.

Referring to FIG. 4, the inlet louver 22 includes a multiple of vanes 32A, 32B, 32C positioned to shield the passages 30A, 30B, 30C and shed anti-icing fluids that may otherwise enter from above. The vanes 32A, 32B, 32C also break up and shed large masses of fluid, are conformal and aligned axially with a free stream airflow to maximize fluid shed with minimal airflow restriction and aircraft drag. In one non-limiting embodiment, the inlet louver 22 is over 80% open to the free stream airflow which has minimal effect on APU efficency. Furthermore, the open flow design of the inlet louver 22 applies minimal spin or prewhirl to the free stream airflow relative the axis of rotation R of the APU 16. Minimal effect upon APU 16 efficiency thus results.

Figure 2:
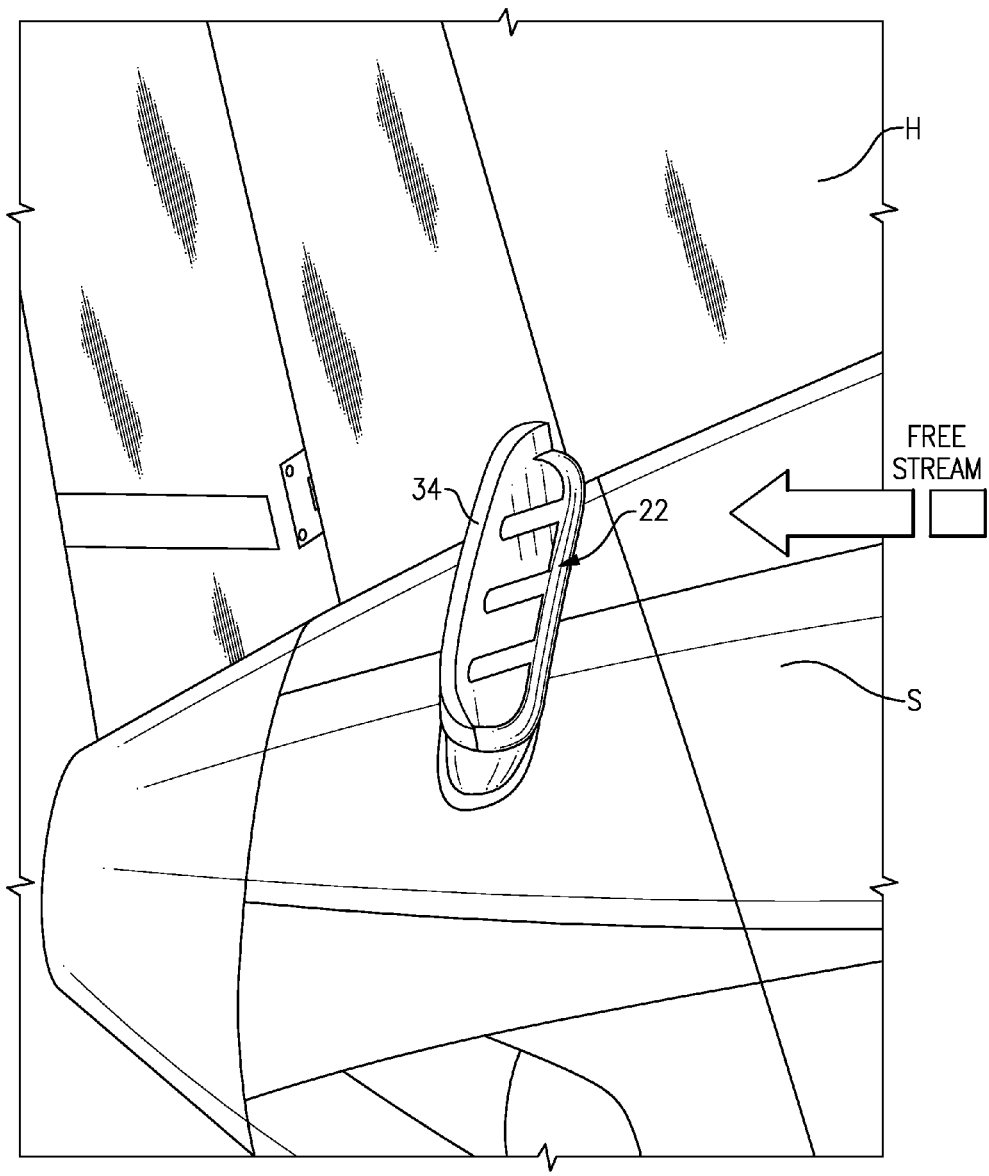
FIG. 2 is a perspective view of an APU inlet which extends from an empennage of an aircraft.
Figure 5A:
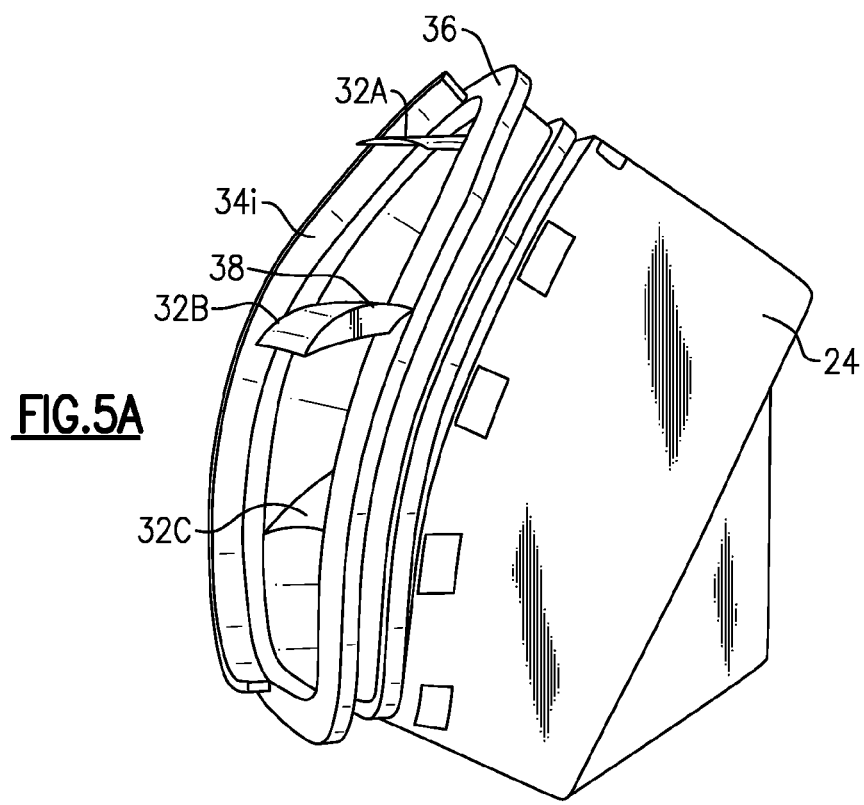
FIGS. 5A-5C are perspective views of the inlet louver according to one non-limiting embodiment of the disclosure.
Figure 5B:
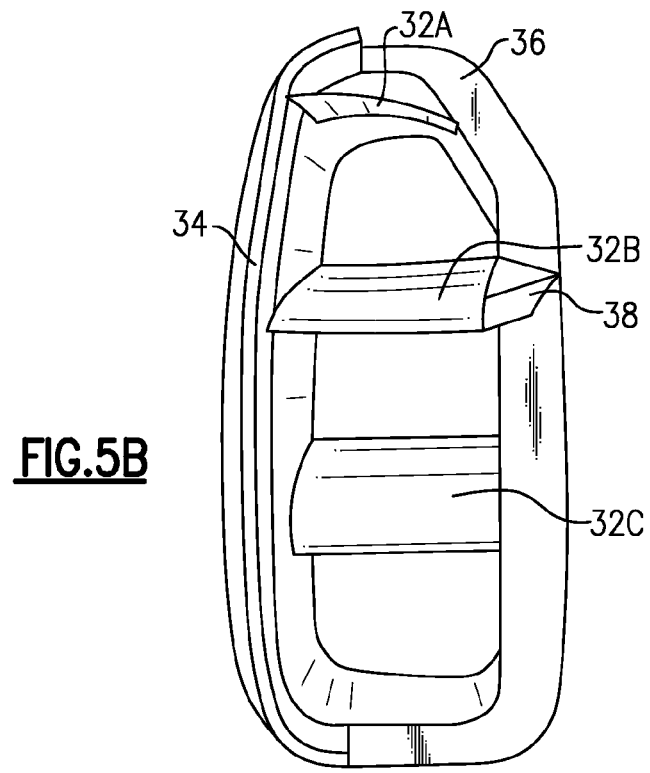
Figure 5C:
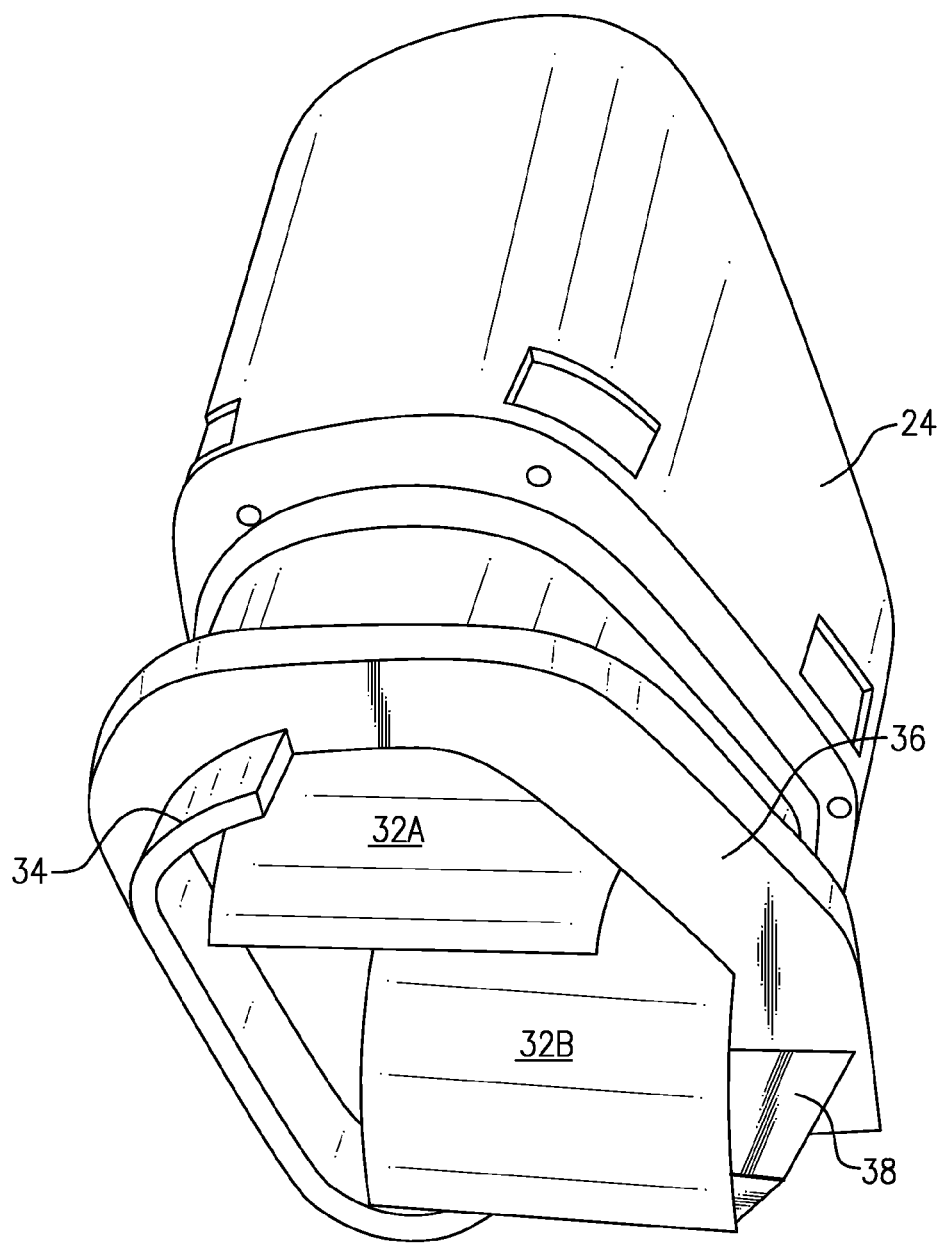

Referring to FIGS. 5A-5C, the multiple of vanes 32A, 32B, 32C are positioned such that fluid which falls vertically transverse to the free stream airflow onto one of the multiple of vanes 32A, 32B, 32C, shed onto the next lower vane in the multiple of vanes 32A, 32B, 32C and eventually away from the inlet assembly 20 (also illustrated in FIG. 2).

The multiple of vanes 32A, 32B, 32C, in one non-limiting embodiment, are at least partially supported on a downstream side by downstream support 34 which extends from an inlet flange 36. The downstream support 34 facilitates the scooping of air into the inlet assembly 20. That is, the downstream support 34 is generally transverse to the free stream airflow. An upstream support 38 may also extend from the inlet flange 36 to at least partially support one or more of the multiple of vanes 32A, 32B, 32C which are essentially edge on relative the free stream airflow.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. An inlet system comprising:
an inlet duct; and
an inlet louver mounted to said inlet duct, said inlet louver defines a multiple of vanes positioned to shield said inlet duct from fluids which fall in a direction transverse to a free stream airflow, each of said multiple of vanes extending longitudinally along a respective axis that is more aligned with the free stream airflow than the direction.

2. The inlet system as set forth in claim 1, wherein said multiple of vanes have longer side edges and shorter end edges, said longer side edges aligned with said free stream airflow.

3. The inlet system as set forth in claim 1, wherein said multiple of vanes are arranged to correspond with a multiple of splitters located within said inlet passage.

4. The inlet system as set forth in claim 1, wherein said multiple of vanes comprises at least one middle vane and laterally outermost vanes, the middle vane arranged to extend outward further than the laterally outermost vanes.

5. The inlet system as set forth in claim 1, wherein at least one of said multiple of vanes extend beyond an inlet flange of said inlet louver.

6. The inlet system as set forth in claim 5, further comprising a downstream support which extends from said inlet flange to at least partially support at least one of said multiple of vanes.

7. The inlet system as set forth in claim 5, further comprising an upstream support which extends from said inlet flange to at least partially support at least one of said multiple of vanes.

8. The inlet system as set forth in claim 1, wherein said inlet louver is open to said free stream airflow.

9. The inlet system as set forth in claim 1, wherein said inlet louver extends outward relative an aircraft skin and is configured to be positioned vertically below a vertical stabilizer of an aircraft.

10. An auxiliary power unit system comprising:
an engine;
an air duct for supplying air to said engine;
an inlet duct in communication with said engine to supply air to said engine; and
an inlet louver mounted to said inlet duct, said inlet louver defines a multiple of vanes positioned to shield said inlet duct from fluids which fall in direction generally transverse to a free stream airflow that moves relative to the inlet duct in a horizontal direction, said multiple of vanes each extending longitudinally along a respective axis that is aligned with the horizontal direction.

11. The auxiliary power unit system as recited in claim 10, wherein said multiple of vanes each have side edges that extend further from said inlet duct than other edges of said multiple of vanes, said side edges aligned with said free stream airflow.

12. The auxiliary power unit system as recited in claim 10, wherein said inlet louver extends outward relative an aircraft skin which encloses said gas turbine engine, and said inlet louver is vertically below a vertical stabilizer of an aircraft, said vanes are vertically stacked relative to a direction of flow through said gas turbine engine.

13. An inlet duct system for an aircraft comprising:
an inlet louver with a multiple of vertically spaced vanes positioned to shield an inlet duct from fluids which fall in direction transverse to a free stream airflow moving relatively toward the inlet louver, said multiple of vanes are side edge on relative said free stream airflow.

14. The inlet duct system as set forth in claim 13, wherein said inlet louver extends outward relative an aircraft skin.

15. The inlet duct system as set forth in claim 13, wherein said multiple of vanes are conformal and aligned axially with said free stream airflow.

16. The inlet duct system as set forth in claim 15, wherein said inlet louver is over 80% open to said free stream airflow.

17. The inlet duct system as set forth in claim 13, wherein said multiple of vanes are at least partially supported on a downstream side by a downstream support.

18. The inlet duct system as set forth in claim 17, wherein said downstream support is transverse to the free stream airflow.

19. The inlet system as set forth in claim 1, wherein the axis is aligned with the free stream airflow.

20. The inlet duct as set forth in claim 13, wherein no portion of the multiple vertically spaced vanes vertically overlaps any other portion of the multiple vertically spaced vanes.

* * * * *